US009892054B2

United States Patent
Shiu

(10) Patent No.: US 9,892,054 B2
(45) Date of Patent: Feb. 13, 2018

(54) METHOD AND APPARATUS FOR MONITORING SYSTEM PERFORMANCE AND DYNAMICALLY UPDATING MEMORY SUB-SYSTEM SETTINGS USING SOFTWARE TO OPTIMIZE PERFORMANCE AND POWER CONSUMPTION

(71) Applicant: GOOGLE INC., Mountain View, CA (US)

(72) Inventor: Shinye Shiu, Mountain View, CA (US)

(73) Assignee: Google LLC, Mountain View, CA (US)

(*) Notice: Subject to any disclaimer, the term of this patent is extended or adjusted under 35 U.S.C. 154(b) by 48 days.

(21) Appl. No.: 14/877,629

(22) Filed: Oct. 7, 2015

(65) Prior Publication Data
US 2016/0098193 A1 Apr. 7, 2016

Related U.S. Application Data

(60) Provisional application No. 62/060,949, filed on Oct. 7, 2014.

(51) Int. Cl.
*G06F 12/1009* (2016.01)
*G06F 3/06* (2006.01)
(Continued)

(52) U.S. Cl.
CPC .......... *G06F 12/1009* (2013.01); *G06F 3/061* (2013.01); *G06F 3/0604* (2013.01); *G06F 3/0638* (2013.01); *G06F 3/0653* (2013.01); *G06F 3/0656* (2013.01); *G06F 3/0673* (2013.01); *G06F 3/0683* (2013.01); *G06F 12/0891* (2013.01); *G06F 12/0897* (2013.01); *G06F 12/1027* (2013.01); *G06F 12/12* (2013.01); *G06F 12/0802* (2013.01);
(Continued)

(58) Field of Classification Search
None
See application file for complete search history.

(56) References Cited

U.S. PATENT DOCUMENTS 5,544,349 A 8/1996 Berry et al.
5,699,539 A 12/1997 Garber et al.
(Continued)

OTHER PUBLICATIONS

International Search Report and Written Opinion for corresponding application No. PCT/US2015/054491 dated Dec. 4, 2015.
(Continued)

*Primary Examiner* — Kevin Verbrugge
(74) *Attorney, Agent, or Firm* — Colby Nipper

(57) ABSTRACT

A method and apparatus are disclosed to monitor system performance and dynamically update memory subsystem settings using software to optimize system performance and power consumption. In an example embodiment, the apparatus monitors a software application's cache performance and provides the software application the cache performance data. The software application, which has a higher-level/macro view of the overall system and better determination of its future requests, analyzes the performance data to determine more optimal memory sub-system settings. The software application provides the system more optimal settings to implement in the memory component to improve the memory and overall system performance and efficiency.

20 Claims, 6 Drawing Sheets

(51) Int. Cl.
*G06F 12/0891* (2016.01)
*G06F 12/12* (2016.01)
*G06F 12/0897* (2016.01)
*G06F 12/1027* (2016.01)
G06F 12/0802 (2016.01)
G06F 12/0864 (2016.01)
G06F 12/121 (2016.01)

(52) U.S. Cl.
CPC ........ *G06F 12/0864* (2013.01); *G06F 12/121* (2013.01); *G06F 2212/1016* (2013.01); *G06F 2212/1044* (2013.01); *G06F 2212/401* (2013.01); *G06F 2212/502* (2013.01); *G06F 2212/601* (2013.01); *G06F 2212/604* (2013.01); *G06F 2212/65* (2013.01); *G06F 2212/68* (2013.01); *G06F 2212/683* (2013.01); *Y02B 60/1225* (2013.01)

(56) References Cited

U.S. PATENT DOCUMENTS

| | | | |
|---|---|---|---|
| 5,978,888 A * | 11/1999 | Arimilli | G06F 12/0864 711/118 |
| 5,991,847 A | 11/1999 | Ballard et al. | |
| 6,434,669 B1 | 8/2002 | Arimilli et al. | |
| 6,532,520 B1 * | 3/2003 | Dean | G06F 12/121 711/123 |
| 6,556,952 B1 | 4/2003 | Magro | |
| 6,877,081 B2 | 4/2005 | Herger | |
| 7,000,074 B2 | 2/2006 | Wootton | |
| 7,185,155 B2 | 2/2007 | Sechrest et al. | |
| 7,383,399 B2 | 6/2008 | Vogt | |
| 7,844,793 B2 | 11/2010 | Herger et al. | |
| 8,375,191 B2 | 2/2013 | Kim | |
| 8,458,404 B1 | 6/2013 | Delgross et al. | |
| 8,484,405 B2 | 7/2013 | Mashtizadeh et al. | |
| 8,516,005 B2 | 8/2013 | Ergan et al. | |
| 9,311,250 B2 | 4/2016 | Van De Ven et al. | |
| 9,740,631 B2 | 8/2017 | Shiu | |
| 9,785,571 B2 | 10/2017 | Shiu | |
| 2002/0073298 A1 | 6/2002 | Geiger et al. | |
| 2002/0147893 A1 | 10/2002 | Roy et al. | |
| 2002/0184579 A1 | 12/2002 | Alvarez et al. | |
| 2003/0061457 A1 | 3/2003 | Geiger et al. | |
| 2003/0221072 A1 * | 11/2003 | Azevedo | G06F 12/0862 711/154 |
| 2006/0136671 A1 | 6/2006 | Balakrishnan et al. | |
| 2006/0179258 A1 | 8/2006 | Dooley et al. | |
| 2010/0281216 A1 | 11/2010 | Patel et al. | |
| 2011/0289277 A1 | 11/2011 | Takada et al. | |
| 2012/0191667 A1 | 7/2012 | Kopylovitz et al. | |
| 2013/0073798 A1 | 3/2013 | Kang et al. | |
| 2013/0326115 A1 | 12/2013 | Goss et al. | |
| 2014/0075118 A1 | 3/2014 | Biswas et al. | |
| 2014/0075137 A1 | 3/2014 | Shin | |
| 2014/0089600 A1 | 3/2014 | Biswas et al. | |
| 2014/0201456 A1 * | 7/2014 | Gibson | G06F 12/084 711/133 |
| 2014/0281235 A1 | 9/2014 | Liu | |
| 2014/0289476 A1 | 9/2014 | Nayak | |
| 2014/0304464 A1 | 10/2014 | Bert | |
| 2015/0178214 A1 | 6/2015 | Alameldeen et al. | |
| 2015/0186282 A1 | 7/2015 | Rahme et al. | |
| 2016/0098353 A1 | 4/2016 | Shiu | |
| 2016/0098356 A1 | 4/2016 | Shiu | |
| 2016/0291891 A1 | 10/2016 | Cheriton | |

OTHER PUBLICATIONS

Yingying, Tian et al., "Last-level Cache Deduplication," Supercomputing, ACM, New York, NY, Jun. 10, 2014, pp. 53-62, XP058051240.
International Search Report and Written Opinion for corresponding application No. PCT/US2015/054496 dated Dec. 18, 2015.
"International Preliminary Report on Patentability", Application No. PCT/US2015/054499, dated Apr. 20, 2017, 10 pages.
"International Preliminary Report on Patentability", Application No. PCT/US2015/054496, dated Apr. 20, 2017, 7 pages.
"International Preliminary Report on Patentability", Application No. PCT/US2015/054491, dated Apr. 20, 2017, 8 pages.
"International Search Report and Written Opinion", Application No. PCT/US2015/054499, dated Nov. 19, 2015, 14 pages.
"Non-Final Office Action", U.S. Appl. No. 14/877,523, dated Feb. 2, 2017, 6 pages.
"Notice of Allowance", U.S. Appl. No. 14/877,484, dated May 15, 2017, 5 pages.
"Notice of Allowance", U.S. Appl. No. 14/877,523, dated May 30, 2017, 4 pages.

* cited by examiner

FIG. 2

System Level Cache (SLC): State and Policy Settings (165)

Software: Calculator (210)
Replacement Algorithm: Least Recently Used
Cache Allocation: 512 KB
Hit Rate: 98%

Software: Display Driver (220)
Replacement Algorithm: Most Recently Used
Cache Allocation: 16 MB
Hit Rate: 90%

Software: Video Player (230)
Replacement Algorithm: Least Frequently Used
Cache Allocation: 64 MB
Hit Rate: 90%

METHOD AND APPARATUS FOR MONITORING SYSTEM PERFORMANCE AND DYNAMICALLY UPDATING MEMORY SUB-SYSTEM SETTINGS USING SOFTWARE TO OPTIMIZE PERFORMANCE AND POWER CONSUMPTION

The present application claims priority to U.S. Provisional Patent Application Ser. No. 62/060,949, filed Oct. 7, 2014, the entire disclosure of which is hereby incorporated by reference.

BACKGROUND

Memory plays a substantial role in systems and has become almost ubiquitous in electronic devices we use today. As more of these devices, such as cell phones, PDAs, watches, and wristbands, incorporate memory into their systems, memory goes beyond the simple role of providing storage and takes into consideration additional factors such as latency, bandwidth, power consumption, weight, size, form factor, etc. Consequently, with these varying and often competing factors, a multitude of designs and methods with respect to memory are implemented to leverage certain benefits.

One of the methods of managing memory and overall system performance is through caching. A cache is a component in a system that handles data requests and stores data so that future requests can be served faster. A cache may be a standalone component or integrated into another component such as the CPU (Central Processing Unit) or GPU (Graphics Processing Unit). The size, level, hierarchy, design, location, and architecture of caches can vary significantly based on the desired objectives of the cache.

To achieve the desired performance and/or efficiency objectives, caches take into consideration many hardware and software related factors. With respect to hardware, factors such as system design, architecture, power, size, speed, and bandwidth are a few considerations. With respect to software, factors such as replacement algorithms, allocation policies, storage distribution, request prioritization, and spatial locality and temporal locality of data are some considerations. These factors are not comprehensive or strictly limited to hardware or software categorizations. Rather, they are illustrative of the broad range of considerations with respect to cache design and implementation.

There are various cache settings/policies that can be implemented to manage cache components and requests for data in a system. One aspect of a cache setting is the replacement algorithm which instructs how the cache component should manage the information it is storing and which items to discard when making room for new ones. Some example replacement algorithms include Least Recently Used (LRU), Most Recently Used (MRU), Random Replacement (RR), Pseudo-LRU (PLRU), Least Frequently Used (LFU), and Adaptive Replacement Cache (ARC). Each of these algorithms provides different methods for storing and handling data in the cache and has certain advantages and disadvantages in certain cases. This is only a brief list of examples in an active and expanding field.

Two key indicators of cache performance which a caching policy is generally trying to improve are "hit ratio" and "latency". The general objective of any desired caching policy is to maximize the hit ratio and minimize latency. Some caching policies keep track of these indicators along with other information to improve their performance.

However, one of the limitations of caching and these low-level performance indicators is the limited scope of data requests. First is a limitation of scope in type of data requests handled by a specific cache component. That is, a Graphics Processing Unit (GPU) cache generally only handles graphics related data requests, and the CPU cache generally only handles CPU related data requests, thus lacking a broader view of incoming requests in the overall system. And second, primarily relying on a relatively small set of previously requested data to predict future requests for data. Since caches have limited storage capacity in order to be effective, they are generally only able to rely on a limited number of previous requests to make assumptions about future requests.

Another limitation is that a cache is generally a shared memory component. That is, multiple applications simultaneously use the same cache components within a system and compete for resources on that system. For example, a word processing application and a calculator application running on a system may both share the same cache components, such as the GPU cache and the CPU cache on a system. Thus, the cache components at a low-level may not be in the best position to determine the optimal memory sub-system settings for both of these applications.

SUMMARY

This specification describes technologies related to optimizing performance and efficiency of memory.

An example component includes one or more processing devices and one or more storage devices storing instructions that, when executed by the one or more processing devices, cause the one or more processing devices to implement an example method. An example method may include monitoring performance of a memory unit in a system; obtaining performance data of said memory unit; determining settings based on obtained performance data and software layer data; and updating settings of said memory unit.

These and other embodiments can optionally include one or more of the following features: the memory unit is a cache component; the memory unit is a buffer; the performance data includes one or more of the following metrics: hit rate, latency, idle time, on-die temperature, memory usage, reference count, bytes transferred, and power/thermal budget; the settings include one or more of the following: cache vs. buffer settings, page attribute settings, replacement algorithms, allocation vs. bypass settings, and quota settings; the settings impact one or more of the said metrics.

The details of one or more embodiments of the disclosure are set forth in the accompanying drawings which are given by way of illustration only, and the description below. Other features, aspects, and advantages of the disclosure will become apparent from the description, the drawings, and the claims. Like reference numbers and designations in the various drawings indicate like elements.

BRIEF DESCRIPTION OF DRAWINGS

FIG. 2 depicts example cache settings of a System Level Cache component.

DETAILED DESCRIPTION

In view of the various limitations with existing approaches described above, what is needed is a method and/or apparatus to monitor system performance and dynamically update memory subsystem settings using software to optimize performance and power consumption. For example, unlike conventional methods and systems of determining cache settings, which rely on low-level and limited set of previous data requests, embodiments of the present disclosure utilize a much higher-level view of the overall system available to better determine future requests and implement more optimal cache policy settings to improve cache performance and/or efficiency.

In an embodiment of the disclosure, there includes steps to monitor performance of a cache component in a system and dynamically update the cache settings of the cache component from software to optimize performance and/or efficiency.

Figure 1:
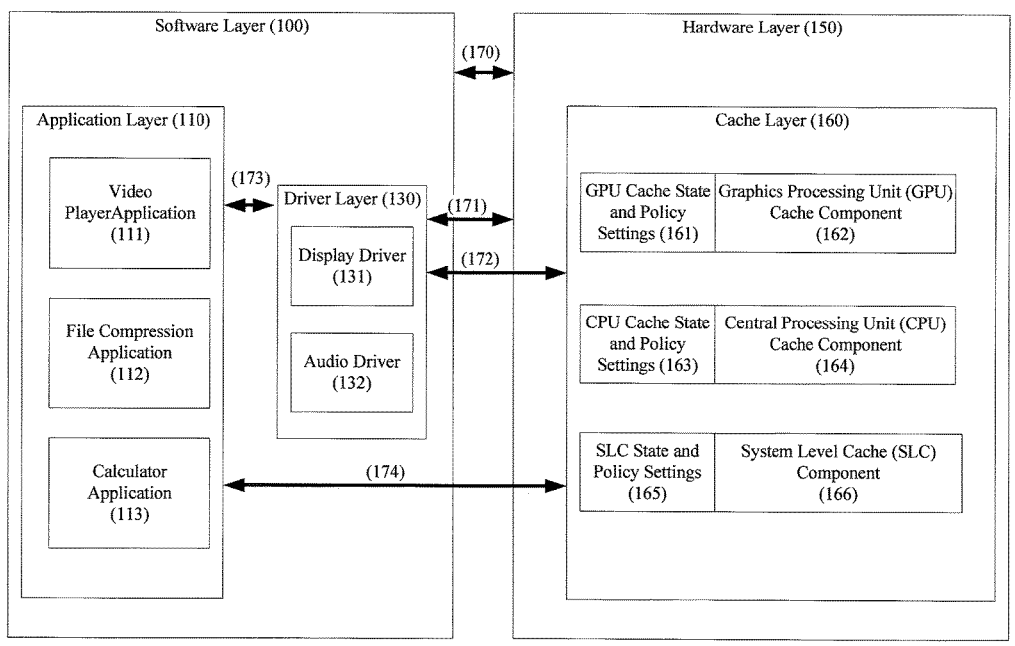
FIG. 1 is a diagram illustrating the various hardware and software layers and sublayers in an example system.

FIG. 1 is a diagram illustrating the various hardware and software layers and sublayers in an example system. FIG. 1 represents only one embodiment of the disclosure described herein and therefore is only meant as an example and should not be considered to limit the scope of the disclosure from alternate embodiments. In some embodiments, depending on the system design and architecture, other layers, such as an operating system layer, a storage layer, or a business logic layer, may or may not be depicted, or may be referred to differently. Also, some layers may be combined and depicted as one layer. Conversely, a layer may be separated into multiple layers or sublayers.

In this example embodiment, the software layer (100) contains an application layer (110) and a driver layer (130). Within the application layer (110), there may be active or inactive applications (111-113), such as a video player application (111), file compression application (112), and a calculator application (113). These applications (111-113) represent typical applications which may exist on a system and may utilize the cache in a system (160-166).

Also depicted is a driver layer (130), which may act as middle layer (see 171-173) between the application layer (110) and the hardware layer (150). In some embodiments drivers (131-132) may be depicted within a middle layer. Here, the drivers (131-132) are depicted within a driver layer (130) which is depicted within a software layer (100) for the purposes of describing the disclosure. Drivers generally act as a bridge of communication between an operating system, applications, and IO devices such as GPUs, video codecs, flash, memory, etc. Here, there is an example display driver (131) which controls display hardware components and an example audio driver (132) which controls audio hardware components. Since drivers (131-132) may be and generally are software instructions, they are depicted here within the software layer (100) for clarity. Also, since drivers (131-132), like software applications (111-113), may be utilized to dynamically update cache settings (161, 163, 165) of cache components (162, 164, 166), they are depicted here within the software layer (100).

FIG. 1 also depicts an example hardware layer (150). This hardware layer (150) here contains only a cache layer (160). However, depending on the design and architecture of a system, different hardware layers and sublayers may or may not exist in a system. The example cache layer (160) depicted here contains three cache components, 1) a Graphics Processing Unit (GPU) (162), 2) a Central Processing Unit (CPU) (164), and 3) a System Level Cache (SLC) (166), with their respective cache state and policy settings (161, 163, 165). In this example embodiment, the cache layer (160) manages the cache configuration (161, 163, 165) and communication (172, 174) between the software layer (100), application layer (110), and the driver layer (130). Alternative cache layer designs may also be used. For example, other cache layer designs may have multi-level cache systems with shared state and policy settings across multiple components. Or in another embodiment, the cache layer may not exist at all and the cache configuration is done directly through the individual cache components themselves.

FIG. 2 depicts example cache settings of a System Level Cache component (166). The example settings shown here contain three entries (210, 220, 230) from the software layer utilizing the cache. The first entry (210) is for the calculator application (113) with its current replacement policy set as "Least Recently Used", a cache allocation quota of 512 KB, and a hit rate of 98%. The second entry (220) is for the display driver (131) with its current replacement policy set as "Most Recently Used", with a cache allocation quota of 16 MB, and a hit rate of 90%. The third entry (230) is for the video player application with its current replacement algorithm set as "Least Frequently Used", a cache allocation quota of 64 MB, and a hit rate of 90%. The example setting entries depicted here are only meant as an example and should not be considered to limit the scope of the disclosure. Other settings and metrics may include latency, reference count, bytes transferred, power/thermal budget, etc. Cache setting fields and types of a cache can vary depending on the architecture and design of the cache and its integration into a system.

The example settings here (210, 220, 230) demonstrate several key points. First, a cache component managing data requests from multiple software applications and drivers. Second, a cache component with varying performance and efficiency indicators, such as cache allocation and hit rate. These indicators allow monitoring overall cache performance for specific software applications/drivers the cache may be handling. Third, cache setting values that allow altering the behavior of the cache, i.e. altering the replacement algorithm and allocation space per entry. As discussed above, the design, setting types, and configurability of a cache will vary based on the design and configuration of a cache in a system. In this example embodiment, the system allows managing cache settings of the cache components via the cache layer.

Figure 3:
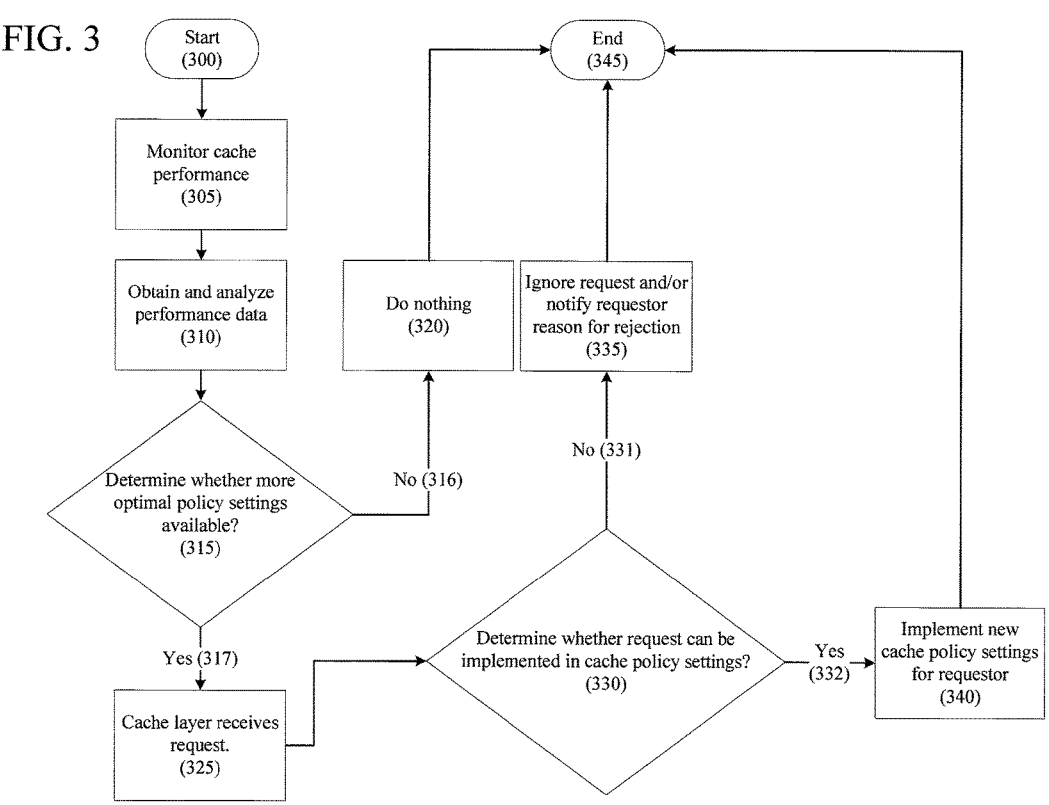
FIG. 3 is a flow diagram of a method for monitoring cache performance and updating cache settings to optimize performance according to one or more embodiments described herein.

FIG. 3 is a flow diagram of a method for monitoring cache performance and updating cache settings to optimize performance. The method begins (300) with monitoring cache performance (305). As described earlier, the performance data may include metrics such as hit rate percentage, access latency response time, idle time, on-die temperature, memory usage count, etc. Here, the software layer may poll the cache layer at certain intervals to obtain cache performance data, or the cache layer may be configured to push the cache performance data at certain intervals. Or, the software or the cache layer may be configured to pull or push the performance data when certain criteria are met. For example, if the hit rate for an entry falls below 90%, the latency exceeds 200 nanoseconds, or the bandwidth/activity drops below 1 GB/s. Depending on the configuration, optimizations can be made for performance when long access latency is observed or for power efficiency when low activity is observed.

Next, the software/driver obtains and analyzes the cache performance data (310) then determines whether more optimal settings are available (315). As discussed above, because software, such as applications and drivers, has a higher-level of visibility in a system, it may be able to better determine potential future requests to determine more optimal cache settings. (An example of this step, where a video player application determines more optimal cache settings based on the video file being played, is described in greater detail in FIG. 4.)

If no optimal settings can be determined (316), then no further action is necessary (320), cache policy settings are not updated, and the method is complete (345). If more optimal settings are available (317), the driver/application may provide the cache layer with more optimal cache policy settings and request the cache policy settings and state may be updated (325).

Next, the cache policy layer determines whether the policy settings can be implemented (330). If the cache layer cannot implement the policy settings for the cache component (331), the request may be rejected or ignored (335), requestor may be notified of the reason, and the method is complete (345). If the settings can be implemented (332), they may be applied to the targeted cache component settings related to the requesting software/driver to optimize its performance (340) and the method is complete (345). In this example embodiment, a cache layer (160) is depicted as a means for the software (111-113) and the cache components (162, 164, 166) to communicate. In another embodiment, the communication and configuration may be done directly with the cache component or a different layer. That is, the software or driver may request the cache component directly, instead of through the cache layer, to apply more optimal cache settings.

Figure 4:
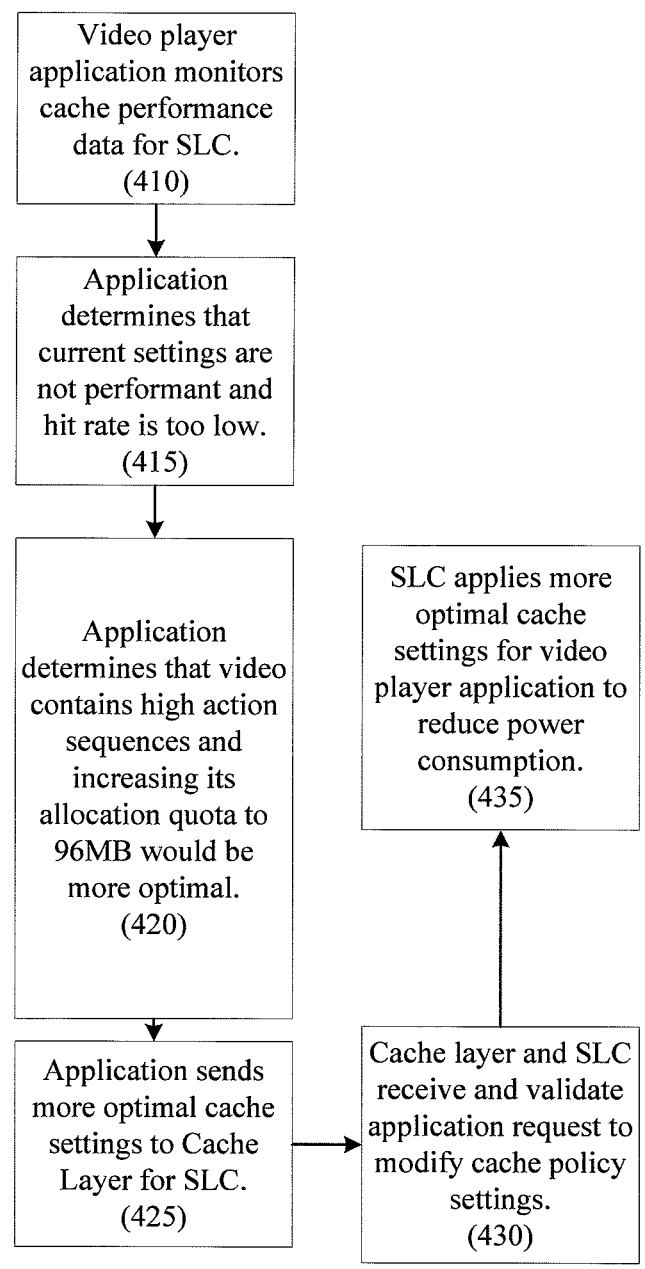
FIG. 4 is an example flow diagram of a video player application monitoring cache performance and providing optimized cache policy settings for a video currently playing according to one or more embodiments described herein.

FIG. 4 is an example flow diagram of a video player application monitoring cache performance and providing more optimal cache policy settings for a video it is currently playing. This example diagram applies cache settings entry from FIG. 2, where the System Level Cache (SLC) (166) is handling data requests for the Video Player application (111). The initial cache settings (230) for the video player application are: a replacement algorithm of "Least Frequently Used", a cache allocation of 64 MB, and a hit rate of 90%.

In the first step of this example, the video player application monitors its current cache performance on the System Level Cache component (410) in the system. Here, the application measures its cache performance and obtains the relevant settings information such as its cache utilization has reached 100% (64 MB) and hit rate of 90%. Based on the obtained performance data along with the high-level information the video player application (111) has available, the video player application (111) can determine if its SLC cache settings (230) can be further optimized.

The high-level information referred to here is information which may be more efficiently analyzed and reviewed at the software layer level (100), as opposed to the lower/hardware-level (150). For example, the high-level information available to the video player application (111) could be the type of upcoming video sequences, allowing it to provide better references frames for future retrieval or suggest better replacement algorithms to improve hit rate for a certain type of video sequence. In this example, the application determines that its current settings are not optimal and the hit rate is too low in the SLC component (415).

The video player application (111) here determines that the current video file being played has numerous upcoming action sequences and proposes a more optimal allocation size for the SLC to improve its performance and efficiency. In this case, the application determines that increasing its allocation quota to 96 MB would be more optimal (420).

Next, the application submits the more optimal settings (425) to the cache layer (160) to request an update of its cache settings (230, 165) in the SLC (166). The cache layer (160) receives and validates the request (430) to modify the SLC cache settings for the video player (230). In this step (430), the cache layer (160) and the SLC component (166) may need to validate certain factors such as ensuring that the requested algorithm is valid and can be handled by the cache component and that the requested space is available and can be allocated. In this case, the validation is successful, the cache layer and SLC can apply requested settings (435) by the video player application (111) which should result in improving the cache's performance and efficiency. The video player application (111) can continue to monitor the performance (410) and repeat the process (415-435) for the SLC (166) or other cache components (162, 164) via the cache layer (160) as needed.

Figure 5:
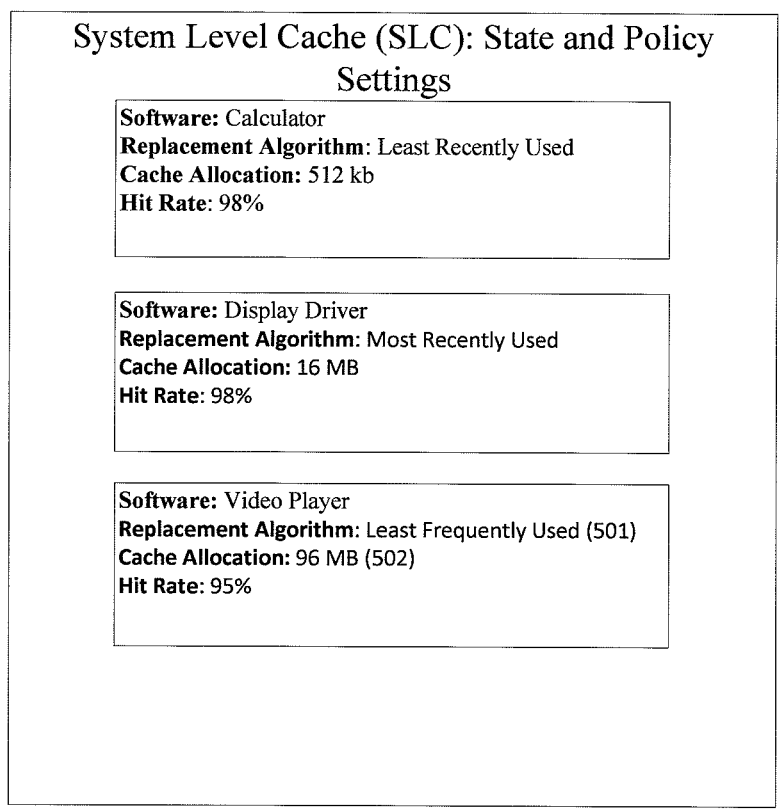
FIG. 5 illustrates example cache settings of a System Level Cache component after the video player application has requested an update using the example steps in FIG. 4 according to one or more embodiments described herein.

FIG. 5 depicts example cache settings of a System Level Cache component (165-166) after the video player application (111) has requested an update using steps in FIG. 4. Of note, in contrast to FIG. 2, the current example shows SLC settings of the video player application updated with a cache allocation quota increased to 96 MB (502).

Figure 6:
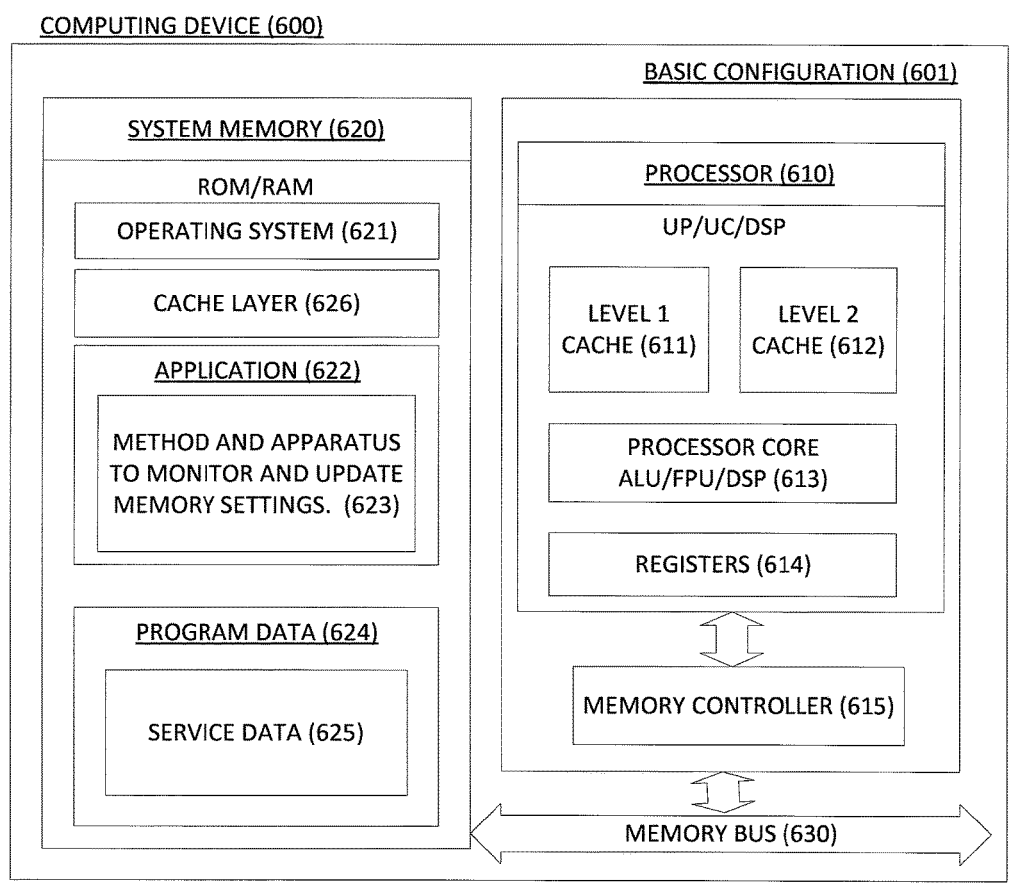
FIG. 6 is a block diagram illustrating an exemplary computing device.

FIG. 6 is a high-level block diagram to show an application on a computing device (600). In a basic configuration (601), the computing device (600) typically includes one or more processors (610), system memory (620), and a memory bus (630) which may implement the method described above. In one embodiment, the memory bus (630) may be used to do communication between processors and system memory and may implement the method described above. Or a cache layer (626) in system memory (620) may implement the method described above.

Depending on different configurations, the processor (610) can be a microprocessor (μP), a microcontroller (μC), a digital signal processor (DSP), or any combination thereof. The processor (610) can include one or more levels of caching, such as a L1 cache (611) and a L2 cache (612), a processor core (613), and registers (614). The processor core (613) can include an arithmetic logic unit (ALU), a floating point unit (FPU), a digital signal processing core (DSP Core), or any combination thereof. A memory controller (616) can either be an independent part or an internal part of the processor (610).

Depending on the desired configuration, the system memory (620) can be of any type including but not limited to volatile memory (such as RAM), non-volatile memory (such as ROM, flash memory, etc.) or any combination thereof. System memory (620) typically includes an operating system (621), one or more applications (622), and program data (624). Program Data (624) includes storing instructions that, when executed by the one or more processing devices, implement a system and method for the described method and component. (623). Or instructions and implementation of the method may be executed via a cache layer (626). In some embodiments, the application (622) can be arranged to operate with program data (624) on an operating system (621).

The computing device (600) can have additional features or functionality, and additional interfaces to facilitate communications between the basic configuration (601) and any required devices and interfaces.

System memory (620) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of the device (600).

The computing device (600) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that includes any of the above functions. The computing device (600) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and/or firmware would be well within the skill of one skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for updating settings of a memory unit, the method comprising:
monitoring performance of the memory unit;
obtaining performance data of the memory unit;
determining, based on the obtained performance data and upcoming needs of an application, to update the settings of the memory unit to new settings, the settings of the memory unit comprising or more of: cache vs. buffer settings, replacement algorithm settings, allocation vs. bypass settings, or quota settings; and
updating the settings of the memory unit to the new settings.

2. The method of claim 1, wherein the obtaining the performance data includes obtaining one or more of the following performance data: hit rate, latency, idle time, on-die temperature, memory usage, reference count, bytes transferred, or power/thermal budget.

3. The method of claim 1, wherein the determining to update the settings of the memory unit to new settings is for a video player application playing a video.

4. The method of claim 1, wherein updating the settings of the memory unit to new settings updates the replacement algorithm settings, and wherein the replacement algorithm settings include: a least-recently-used replacement algorithm setting, a most-recently-used replacement algorithm setting, or a least-frequently-used replacement algorithm setting.

5. The method of claim 4 further comprising, prior to the updating the replacement algorithm settings, validating replacement algorithms corresponding to the replacement algorithm settings.

6. The method of claim 1, wherein updating the settings of the memory unit to new settings updates the replacement algorithm settings, and wherein the replacement algorithm settings include: a random replacement algorithm setting, a pseudo-least recently used algorithm setting, or an adaptive replacement cache algorithm setting.

7. An apparatus for updating settings of a memory unit, the apparatus comprising:
one or more processing devices configured to:
monitor performance of the memory unit;
obtain performance data of the memory unit;
determine, based on the obtained performance data and upcoming needs of an application, to update the settings of the memory unit to new settings, the settings of the memory unit comprising one or more of: cache vs. buffer settings, replacement algorithm settings, allocation vs. bypass settings, or quota settings; and
update the settings of the memory unit to the new settings.

8. The apparatus of claim 7, wherein the memory unit is a cache component.

9. The apparatus of claim 7, wherein the memory unit is a buffer.

10. The apparatus of claim 7, wherein the one or more processing devices configured to obtain the performance data includes obtaining one or more of the following performance data: hit rate, latency, idle time, on-die temperature, memory usage, reference count, bytes transferred, or power/thermal budget.

11. The apparatus of claim 7, wherein the apparatus further comprises a software layer comprising an application layer and a driver layer.

12. The apparatus of claim 7, wherein the apparatus further comprises a hardware layer including a cache layer.

13. The apparatus of claim 12, wherein the cache layer comprises a graphics processing unit cache component, a central processing unit cache component, and a system level cache component.

14. The apparatus of claim 7, wherein the one or more processors are further configured to validate availability of requested space in the memory unit.

15. The apparatus of claim 7, wherein the one or more processing devices are further configured to validate that a replacement algorithm corresponding to a replacement algorithm setting is valid.

16. An apparatus, the apparatus comprising:
a software layer comprising an application layer and a driver layer;
a hardware layer comprising a cache layer; and
one or more processing devices configured to:
monitor the hardware layer for performance of a memory unit contained in the cache layer;
review the software layer for upcoming needs of an active application contained in the application layer;
cause, based on the performance of the memory unit and the upcoming needs of the active application, the driver layer to update the settings of the memory unit, the settings of the memory unit comprising one or more of cache vs. buffer settings, replacement algorithm settings, allocation vs. bypass settings, or quota settings.

17. The apparatus of claim 16, wherein the memory unit contained in the cache layer is a graphics processing unit cache component, a central processing unit cache component, or a system level cache component.

18. The apparatus of claim 16, wherein the driver layer comprises a display driver and an audio driver.

19. The apparatus of claim 16, wherein the application layer comprises a video player application, a file compression application, or a calculator application.

20. The apparatus of claim 16, wherein the one or more processing devices are further configured to cause the cache layer to validate replacement algorithms corresponding to the replacement algorithm settings.

* * * * *